UNITED STATES PATENT OFFICE.

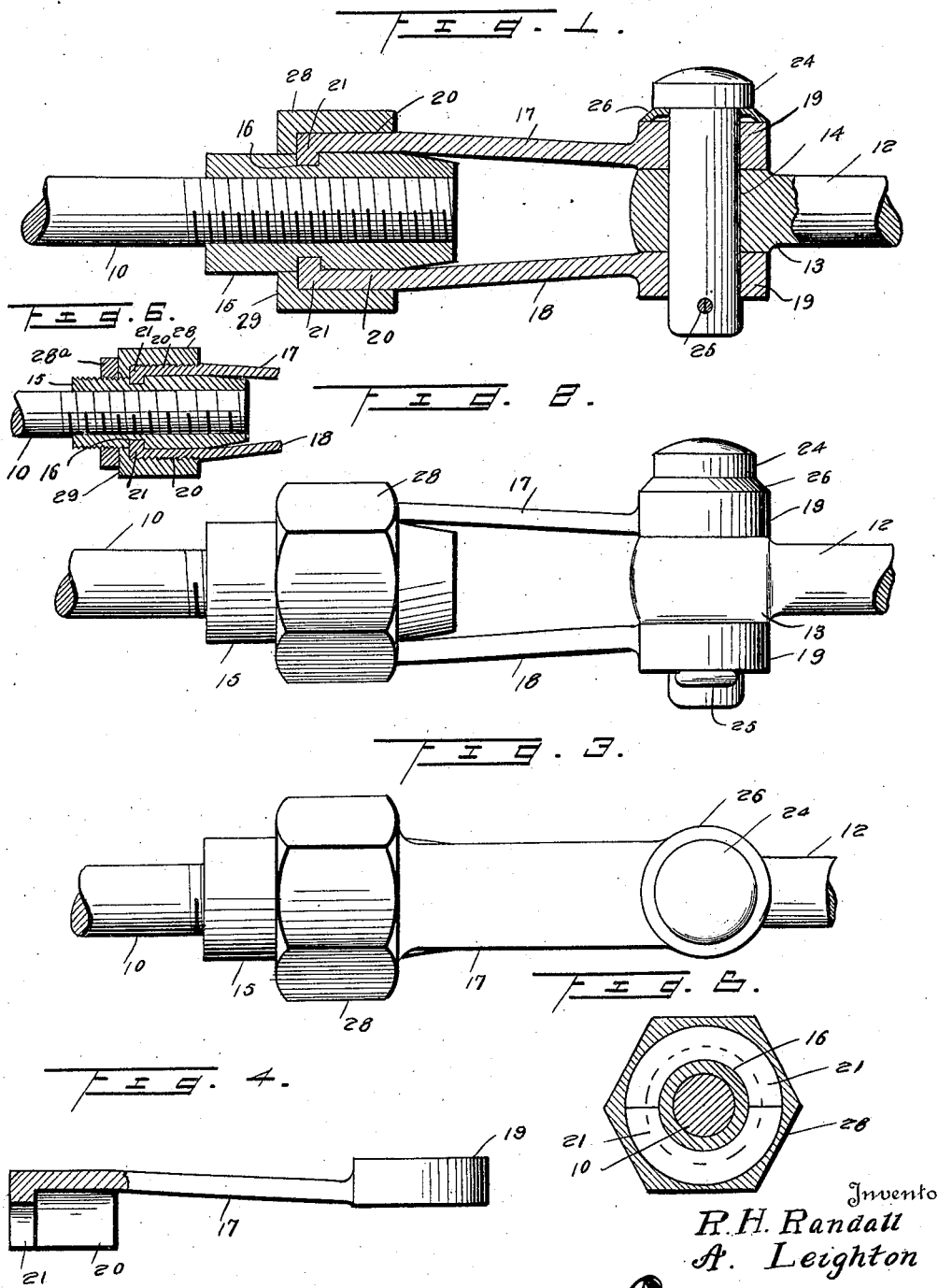

RICHARD H. RANDALL AND ALBERT LEIGHTON, OF BROCKTON, MASSACHUSETTS.

RESILIENT YOKE CONNECTION.

1,395,871.

Specification of Letters Patent.  Patented Nov. 1, 1921.

Application filed June 15, 1920. Serial No. 389,128.

*To all whom it may concern:*

Be it known that we, RICHARD H. RANDALL and ALBERT LEIGHTON, citizens of the United States, residing at Brockton, in the county of Plymouth and State of Massachusetts, have invented certain new and useful Improvements in Resilient Yoke Connections; and we do hereby declare the following to be a full, clear, and exact description of the invention, such as will enable others skilled in the art to which it appertains to make and use the same.

This invention relates to the construction of connecting devices for the ends of rods and especially for those used in connection with the construction of motor vehicles. The object is to provide a yoke connection with means for securing the latter to the ends of one of the rods, the ends of the yoke resiliently engaging an apertured end portion of the other rod, for the purpose of producing a joint which will be constantly maintained in proper condition, thus avoiding rattling, due to vibration to which the parts may be subjected.

A further object is to provide, in a connection of the type indicated, a resilient element having apertured ends normally approaching each other but adapted to be forced apart by the insertion therebetween of the apertured end of one of the rods, and threaded means securing the resilient elements to the other of said rods.

With the foregoing and other objects in view, the invention consists in the novel construction, combination, and arrangement of elements hereinafter described and claimed.

In the accompanying drawing—

Figure 1 is a view showing the connection in longitudinal section.

Fig. 2 is a plan view.

Fig. 3 is a view in side elevation.

Fig. 4 is a detailed view of the resilient yoke.

Fig. 5 is a detailed view of means for connecting the yoke to one of the rods, and Fig. 6 is a sectional view illustrating a slightly modified manner of securing the collar in place.

The rods to be connected are designated 10 and 12, the rod 12 being provided with a head 13 having a transverse aperture 14 therein.

One end of the rod 10 is threaded, the threaded portion engaging the threaded bore of sleeve 15, and this element last named is provided with annular channel or groove 16. The yoke may comprise a plurality of elements 17 and 18, each including a shank portion, an apertured end portion 19, and an approximately semi-cylindrical portion 20. These portions 20 are turned toward each other and embrace the sleeve 15, and inwardly turned portions 21 thereof engage in the annular groove 16. If desired however this yoke member may be formed in one piece, but in any event the distance between the yoke ends 19, before the insertion of the end of the rod 12, is less than the thickness of said rod so that these forked ends will firmly but resiliently engage the sides of the head of the rod 12.

A pin or bolt 24 passes through the apertured end portions 19 and through the apertured head of rod 12 and is secured by a cotter pin 25. Beneath the head of the pin 24 is a spring washer 26, serving an obvious purpose. A collar 28 having a flanged portion 29 surrounds the curved or segmental portions 20 of elements 17 and 18, the flange abutting the ends of the elements. This element 28 may be hexagonal in exterior configuration to permit of engagement by a wrench or other suitable tool. The collar 28 may be pressed over the sleeve 15 and the portions 20 of the elements 17 and 18 by means of a power press, or it may be shrunk upon the sleeve and said portions, either manner of applying the collar insuring a firm and permanent connection of the collar to said parts. The collar 28 also may be threaded upon the sleeve 15 and the portions 20 and secured in place by a jamb nut 28ᵃ, as shown in Fig. 6 of the drawing.

In view of the resiliency of the yoke, formed and mounted as above specified, and the function of the spring washer, a connection is effected which will be permanently maintained in good condition, thus avoiding rattling due to excessive vibration of the parts.

Having thus described our invention, what we claim is:—

1. In a device of the class described, a plurality of yoke elements having apertured ends, means for connecting the apertured ends to a rod, and means for connecting the opposite ends of the yoke elements to a second rod in approximate alinement with the rod first named, the said yoke elements being of resilient material.

2. In a device of the class described, a plurality of yoke elements formed of resilient material and having corresponding ends provided with apertures, and opposite ends provided with approximately semi-cylindrical portions, a threaded tubular element engaged by said semi-cylindrical portions, and means for positively effecting said engagement, the tubular element having connection with the end of a rod in approximate alinement with the rod first named.

3. In a device of the class described, a plurality of engaging elements formed of resilient material, corresponding ends of said elements being provided with approximately semi-cylindrical portions, means for clamping said elements on opposite sides of a tubular device, a plurality of rods having their ends approaching each other, and means for connecting the ends of the rod with the resilient elements.

4. In a device of the class described, a yoke member including resilient forked ends, a rod including a head having a transverse aperture therein, the resilient forked ends firmly engaging the sides of the head, a second rod, and means for adjustably connecting the yoke with the rod last named.

5. In a device of the class described, a threaded element adapted for engagement with the end of a rod and provided with an annular groove on the exterior portion thereof, means constituting a resilient yoke element engaged by the threaded element and means for engaging the outer portion of the yoke at one end thereof, the yoke being provided with inwardly turned portions engaging the groove, and means for connecting the free ends of the yoke with a second rod.

6. In a device of the class described, a tubular element having a threaded bore for connection with the end of a rod, said element being provided with an exterior annular groove, a resilient element constituting a yoke and having inwardly turned portions at one end for engagement with the groove, a retaining device for effecting such engagement, said yoke having apertured forked ends tending to approach each other, a pin passing transversely through the apertures of the ends, securing means for the pin, and a resilient device for preventing the longitudinal movement of the pin.

7. In a device of the class described, a plurality of yoke elements, a sleeve, means for mounting one end of said yoke elements on said sleeve, said sleeve being adapted to be secured upon the end of a rod, and means for connecting the opposite ends of said yoke elements with a second rod in alinement with the first mentioned rod.

8. In a device of the class described, a plurality of yoke elements, means for securing said yoke elements against independent movement, said yoke elements converging slightly toward their free ends, means for mounting the connected yoke elements on a rod with the yoke elements extended from the end thereof, said yoke elements being adapted to receive between their free ends, a second rod adapted for turning movement with respect to the first mentioned rod, means for securing said second mentioned rod between the ends of said yoke elements, and means mounted on the last mentioned means to cause a resilient gripping action of the yoke element upon said second mentioned rod.

In testimony whereof we affix our signatures in presence of two witnesses.

RICHARD H. RANDALL.
ALBERT LEIGHTON.

Witnesses:
WALTER F. STEPHENS,
FRANK W. CLARK.